(12) United States Patent
Padmanabhan et al.

(10) Patent No.: US 11,759,976 B2
(45) Date of Patent: Sep. 19, 2023

(54) CONTINUOUS GRANULATION SYSTEM AND METHOD FOR OBTAINING CONDITIONED GRANULES

(71) Applicant: STEERLIFE INDIA PRIVATE LIMITED, Bengaluru (IN)

(72) Inventors: Babu Padmanabhan, Bengaluru (IN); Indu Bhushan, Bengaluru (IN); Vinay Rao, Bengaluru (IN)

(73) Assignee: Steerlife India Private Limited, Bengaluru (IN)

( * ) Notice: Subject to any disclaimer, the term of this patent is extended or adjusted under 35 U.S.C. 154(b) by 0 days.

(21) Appl. No.: 18/016,246

(22) PCT Filed: Jul. 14, 2021

(86) PCT No.: PCT/IB2021/056327
§ 371 (c)(1),
(2) Date: Jan. 13, 2023

(87) PCT Pub. No.: WO2022/013763
PCT Pub. Date: Jan. 20, 2022

(65) Prior Publication Data
US 2023/0226723 A1    Jul. 20, 2023

(30) Foreign Application Priority Data
Jul. 14, 2020    (IN) .............................. 202041029972

(51) Int. Cl.
*B01J 2/16* (2006.01)
*B29B 9/16* (2006.01)
(Continued)

(52) U.S. Cl.
CPC ................... *B29B 9/02* (2013.01); *B01J 2/16* (2013.01); *B01J 2/20* (2013.01); *B29B 9/08* (2013.01);
(Continued)

(58) Field of Classification Search
CPC .... B29B 9/06; B29B 9/08; B29B 9/16; B29B 2009/165; B29B 2009/168; B01J 2/16
See application file for complete search history.

(56) References Cited

U.S. PATENT DOCUMENTS 3,597,850 A    8/1971    Jenkins
3,880,968 A    4/1975    Kaspar et al.
(Continued)

FOREIGN PATENT DOCUMENTS

WO    WO 2008104923    9/2008

OTHER PUBLICATIONS

International Search Report received in PCT/IB2021/056327, dated Nov. 4, 2021, 2 pages.
(Continued)

*Primary Examiner* — Mary Lynn F Theisen
(74) *Attorney, Agent, or Firm* — Klarquist Sparkman, LLP

(57) ABSTRACT

A continuous granulation system for obtaining conditioned granules is disclosed. The system comprises a processor configured to produce a continuous flow of granules at an outlet of the processor. The system also comprises a collection chamber positioned downstream from the processor and configured to collect the granules from the outlet. Further, the system comprises an air displacement device coupled to the collection chamber and configured to create a unidirectional flow of air at the outlet in a direction of the granules exiting the processor and away from the outlet. The unidirectional flow of air conditions the granules obtained in the collection chamber. A continuous granulation method and a continuous granule collection system for obtaining the conditioned granules is also disclosed.

31 Claims, 9 Drawing Sheets

(51) Int. Cl.
*B29B 9/08* (2006.01)
*B29B 9/02* (2006.01)
*B01J 2/20* (2006.01)

(52) U.S. Cl.
CPC .......... *B29B 9/16* (2013.01); *B29B 2009/165* (2013.01); *B29B 2009/168* (2013.01)

(56) References Cited

U.S. PATENT DOCUMENTS

| | | | | |
|---|---|---|---|---|
| 4,413,971 | A | * | 11/1983 | Nettleton ................ B29B 13/06 |
| | | | | 264/142 |
| 4,895,733 | A | | 1/1990 | Imanidis et al. |
| 5,693,362 | A | | 12/1997 | Boos et al. |
| 5,698,237 | A | * | 12/1997 | Bacher ..................... B29B 9/06 |
| | | | | 425/313 |
| 9,956,709 | B2 | * | 5/2018 | Padmanabhan ......... B29C 48/00 |
| 2007/0274789 | A1 | * | 11/2007 | DeBruin .................. C08F 6/28 |
| | | | | 406/197 |
| 2016/0131426 | A1 | | 5/2016 | Fuseuma et al. |
| 2019/0134875 | A1 | * | 5/2019 | Bhushan ................ B29B 7/483 |
| 2020/0071229 | A1 | | 3/2020 | Brunnmair et al. |

OTHER PUBLICATIONS

Written Opinion received in PCT/IB2021/056327, dated Nov. 4, 2021, 8 pages.
International Preliminary Report on Patentability, received in PCT/IB2021/056327, dated Jun. 17, 2022, 6 pages.

* cited by examiner

CONTINUOUS GRANULATION SYSTEM AND METHOD FOR OBTAINING CONDITIONED GRANULES

CROSS REFERENCE TO RELATED APPLICATIONS

This is the U.S. National Stage of International Application No. PCT/IB2021/056327, filed Jul. 14, 2021, which was published in English under PCT Article 21(2), which in turn claims the benefit of India Application No. 202041029972, filed in India on Jul. 14, 2020. Both applications are incorporated herein in their entirety.

FIELD OF INVENTION

The present disclosure relates to the field of granulation. Particularly, the present disclosure relates to a continuous granulation system and method for obtaining conditioned granules.

BACKGROUND OF THE INVENTION

Typically, in material processing industries, multiple and/or different processing methods may be employed during production. Examples of the processing methods include, but are not limited to, granulation, extrusion, fragmentation, heating, drying, and sizing of a material to be processed. Granulation is the process of forming grains or granules from a powdery or solid material, and thereby producing a granular material, herein referred to as "granules". Different types of granulation, such as, for example, dry granulation and wet granulation, are employed depending on a material to be granulated. Typically, a processor such as a granulation device is used to agglomerate the powdery or solid material in order to produce the granules. Additional heating, cooling, and/or drying systems are used in conjunction with the processor to obtain stable or conditioned granules. For example, wet granulation requires tray drying of the granules obtained from the processor whereas melt granulation requires cooling of the granules obtained from the processor. Use of additional systems in conjunction with the processor for conditioning of the granules may be time consuming, and often, cumbersome, complex, and space consuming. Further, formation of large agglomerates due to accumulation of moisture, such as on account of condensation of vapor, is also known to cause process disruptions, including causing blockages, in the processor.

SUMMARY OF THE INVENTION

In an aspect of the present disclosure, a continuous granulation system for obtaining conditioned granules is disclosed. The continuous granulation system comprises a processor configured to produce a continuous flow of granules at an outlet of the processor. The continuous granulation system also comprises a collection chamber positioned downstream from the processor and configured to collect the granules from the outlet. Further, the continuous granulation system comprises an air displacement device coupled to the collection chamber. The air displacement device is configured to create a unidirectional flow of air at the outlet in a direction of the granules exiting the processor and away from the outlet. The unidirectional flow of air conditions the granules obtained in the collection chamber.

In another aspect of the present disclosure, a continuous granulation method for obtaining conditioned granules is disclosed. The continuous granulation method comprises introducing feed material at an inlet of a processor. The continuous granulation method also comprises processing, by the processor, the feed material to produce a continuous flow of granules at an outlet of the processor. Further, the continuous granulation method comprises receiving the granules from the outlet in a collection chamber. In addition, the continuous granulation method comprises creating a unidirectional flow of air at the outlet in a direction of the granules exiting the processor and away from the outlet by means of an air displacement device. The unidirectional flow of air conditions the granules obtained in the collection chamber.

In yet another aspect of the present disclosure, a continuous granule collection system for obtaining conditioned granules from a continuous granulator is disclosed. The continuous granule collection system comprises a collection chamber positioned downstream from the continuous granulator and configured to collect the granules from the outlet of the continuous granulator. The continuous granule collection system also comprises an air displacement device coupled to the collection chamber. The air displacement device is configured to create a unidirectional flow of air at the outlet in a direction of the granules exiting the continuous granulator and away from the outlet. The unidirectional flow of air conditions the granules obtained in the collection chamber.

BRIEF DESCRIPTION OF DRAWINGS

The accompanying drawings, similar reference numerals, may refer to identical or functionally similar elements. These reference numerals are used in the detailed description to illustrate various embodiments and to explain various aspects and advantages of the present disclosure.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various embodiments of the present disclosure.

DETAILED DESCRIPTION

Figure 1:
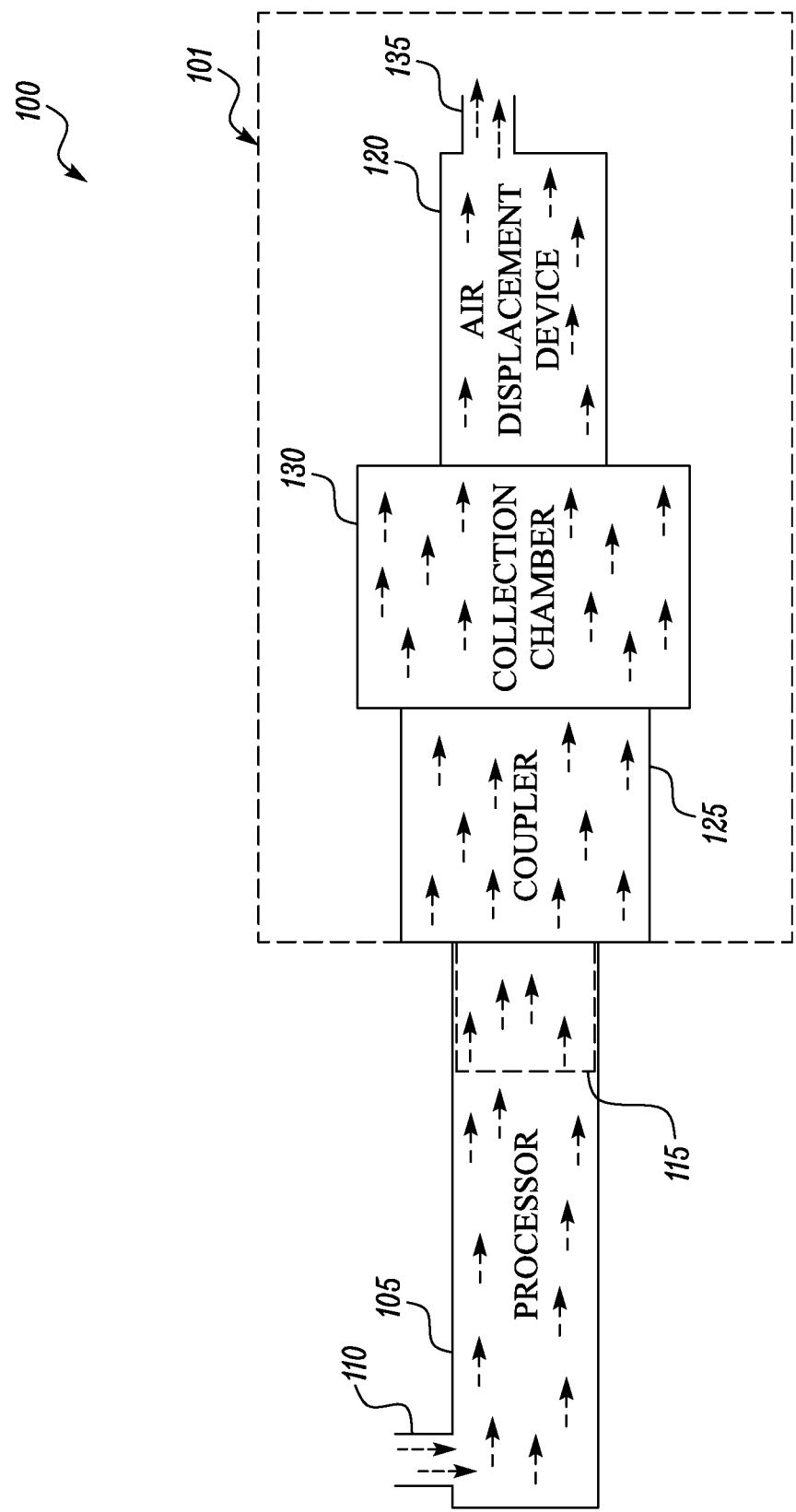
FIG. 1 is a schematic block diagram of a continuous granulation system for obtaining conditioned granules, in accordance with an embodiment of the present disclosure.

Referring to FIG. 1, an exemplary schematic illustration of a continuous granulation system 100 for obtaining conditioned granules, in accordance with a first embodiment, is disclosed. The continuous granulation system 100 includes a processor 105 receives a feed of a powdery or solid material, herein referred to as "feed material", at an inlet 110 of the processor 105. Examples of the processor 105 include, but are not limited to, a continuous granulator or granulation device and a granulation and drying device. Example of a granulation device includes Omega 20P by STEER Engineering Private Limited. Examples of the granulation and drying device include, but are not limited to, a single screw or multiple-screw granulator and dryer such as the INTE-GRAAL® by STEER Engineering Private Limited. The processor 105 may be configured for different granulation methods and/or processes including, but not limited to, dry or wet granulation, steam granulation, melt granulation, thermal adhesion granulation, or foam granulation. The processor 105 may include different parts and components such as for example, an impeller, screws, conveyers, mixers, millers, and dryers in order to process the feed material received at the inlet 110 of the processor 105 into granules. The processor 105 may be configured to produce a continuous flow of the granules that may exit the processor 105 from an outlet 115 of the processor 105. In an embodiment, the outlet 115 may correspond to an outlet barrel of the processor 105. In an embodiment, the outlet 115 of the processor 105 may not be constricted, such as by way of a die.

Figure 2:
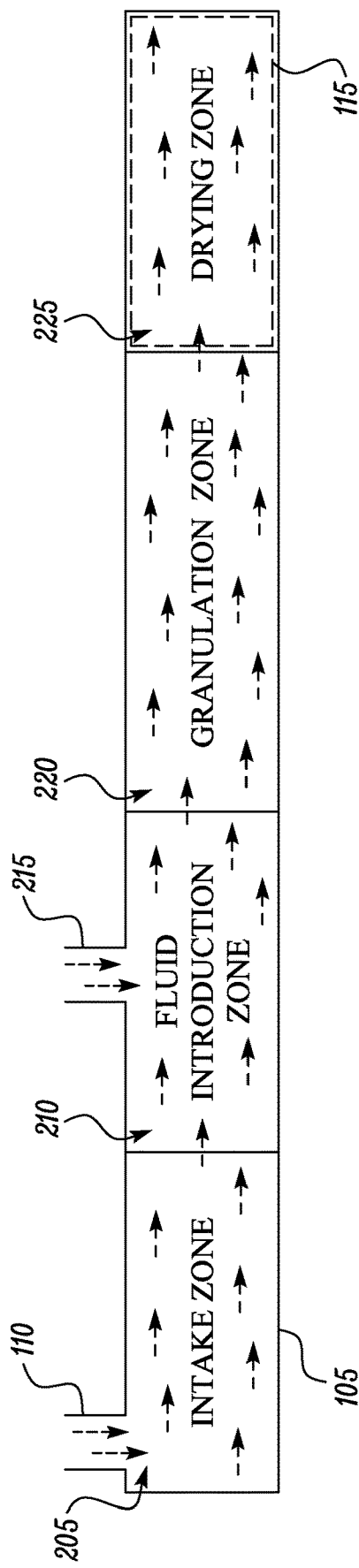
FIG. 2 is an exemplary block diagram of the processor of FIG. 1 that corresponds to a granulation and drying device, in accordance with an embodiment of the present disclosure.

Referring to FIG. 2, an exemplary embodiment of the processor 105 of FIG. 1 that corresponds to the granulation and drying device is disclosed. The processor 105 may include one or more zones 205, 210, 220, 225 to process the feed material. For example, the processor 105 may include an intake zone 205 that receives the feed material to be processed via the inlet 110 along with atmospheric air. The feed material may be introduced in the intake zone 205 continuously or intermittently at predefined periods of time. The feed material may then be conveyed to a fluid introduction zone 210 from the intake zone 205. Fluids such as, for example, oil, water, binding agents, and/or wet granulation solutions, may be introduced in the fluid introduction zone 210 via an opening 215 in the processor 105. In an embodiment, the fluids may be introduced in the fluid introduction zone 210 simultaneously along with the introduction of the feed material in the intake zone 205. In another embodiment, the fluids may be introduced intermittently at the same predefined periods of time established for the introduction of the feed material at the intake zone 105. The material may then be conveyed from the fluid introduction zone 210 to a granulation zone 220. The feed material may be agglomerated and processed into the granules in the granulation zone 220. Sizing of the granules, thus produced, may also be carried out in the granulation zone 220. The granules from the granulation zone 220 may then be conveyed to a drying zone 225 for drying. In an embodiment, the outlet 115 may include the drying zone 225 configured to continuously convey the dried granules out of the processor 105 from the outlet 115.

Referring again to FIG. 1, the continuous granulation system 100 may include an air displacement device 120 configured to create a unidirectional flow of air at the outlet 105 in a direction of the granules exiting the processor 105 and away from the outlet 115. The unidirectional flow of air may condition the granules obtained in the collection chamber 130. Examples of the air displacement device 120 include, but not limited to, a vacuum or suction device, an exhaust fan, and a blower. The continuous granulation system 100 may also include a collection chamber 130 positioned downstream from the processor 105 and coupled with the air displacement device 120 for collection of the granules. The collection chamber 130 may be placed outside the air displacement device 120. In an embodiment, the collection chamber 130 is placed upstream of the air displacement device 120. The continuous granulation system 100 may also include a coupler 125 that is connected to the outlet 115 of the processor 105 at one end and to the collection chamber 130 at another end. In an embodiment, the coupler 125 may be connected to and/or in communication with the collection chamber 130 via ducts or pipes. The collection chamber 130 may, in turn, be connected to and/or in communication with the air displacement device 120 via ducts and/or pipes. The coupler 125 may provide a hermetically sealed channel between the outlet 115 and the collection chamber 130.

Figure 3:
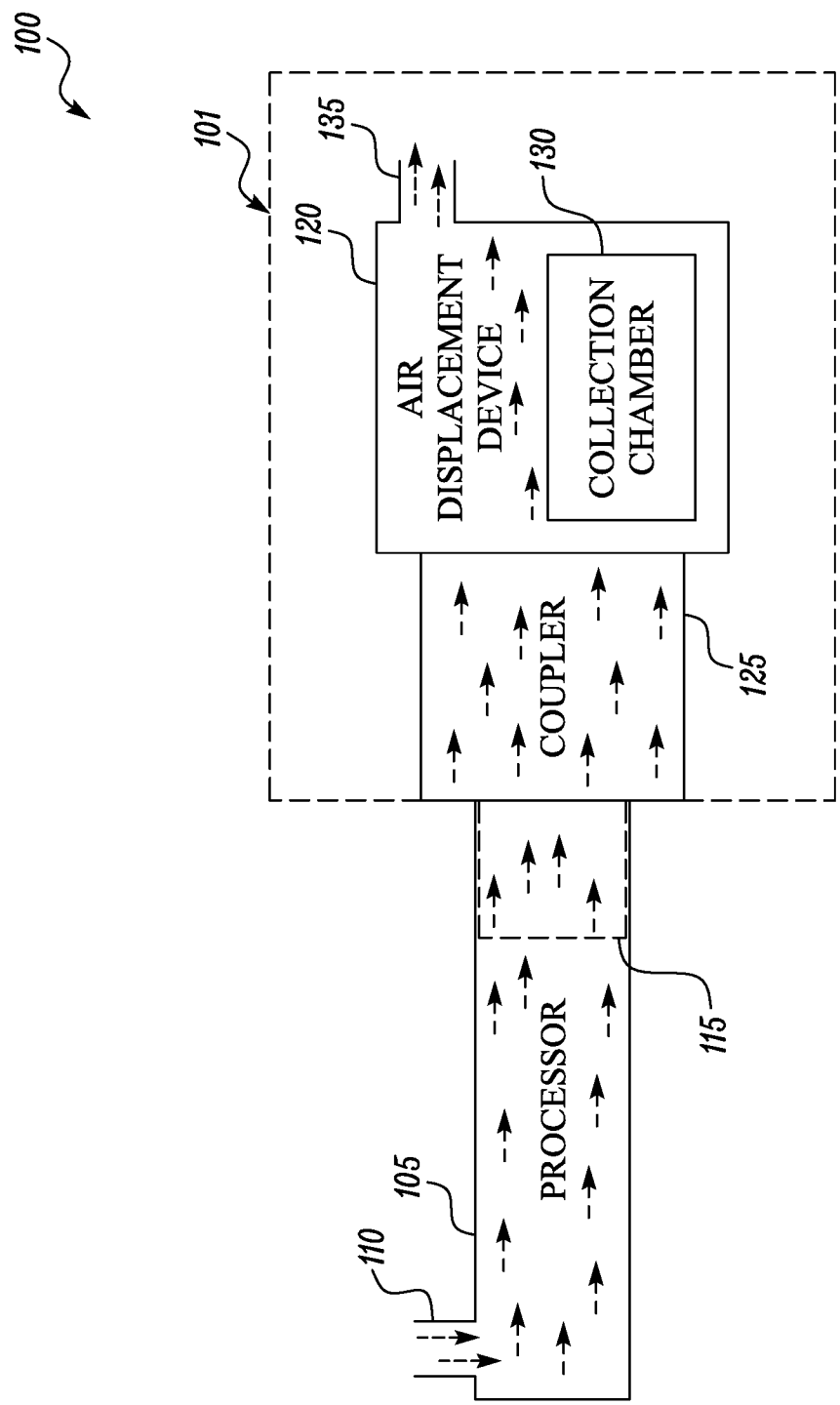
FIG. 3 is a schematic block diagram of a continuous granulation system for obtaining conditioned granules, in accordance with an embodiment of the present disclosure.

In another embodiment, as shown in FIG. 3, the collection chamber 130 may be placed within the air displacement device 120. The collection chamber 130 may be connected to and/or in communication with the air displacement device 120 via internal ducts and/or pipes. Accordingly, in the embodiment as shown in FIG. 3, the coupler 125 may be connected to the outlet 115 of the processor 105 at one end and to the air displacement device 120 at another end. Further, coupler 125 may provide the hermetically sealed channel between the outlet 115 and the air displacement device 120.

Referring to FIG. 1 and FIG. 3, the air displacement device 120 may be configured to create a pressure difference between a fluid pressure inside the hermetically sealed channel and an atmospheric pressure outside the processor 105 as a result of the unidirectional flow of air. In an embodiment, the unidirectional flow of air created by the air displacement device 120 may result in a lower fluid pressure inside the hermetically sealed channel provided by the coupler 125 in comparison to an atmospheric pressure outside the processor 105. Further, the unidirectional flow of air and the lower fluid pressure in the hermetically sealed channel may facilitate the granules to be pulled away from the outlet 115 and into the collection chamber 130 via the coupler 125. In an embodiment, the air displacement device 120 may also facilitate the unidirectional flow of air inside the processor 105 from the inlet 110 to the outlet 115 of the processor 105. In an embodiment, the air displacement device 120 may be configured to create a pressure difference between a fluid pressure inside the outlet 115 of the processor 105 and the atmospheric pressure outside the processor 105 as a result of the unidirectional flow of air. In an embodiment, the unidirectional flow of air created by the air displacement device 120 may result in a lower fluid pressure inside the outlet 115 of the processor 105 in comparison to an atmospheric pressure outside the processor 105. Further, the air displacement device 120 may comprise an exhaust 135 configured to continuously displace the air from the collection chamber 130 to an outside environment. In an embodiment, the air displacement device 120 may be configured to generate the unidirectional flow of air from the inlet 110 of the processor 105 to the exhaust 135 of the air displacement device 120. The air displacement device 120 may also control a volume and velocity of the air being displaced. The continuous displacement of air by the air displacement device 120 may also prevent a condensation of vapor generated from the granules exiting the processor 105. In the embodiments as shown in FIG. 1 and FIG. 3, the coupler 125, the collection chamber 130, and the air displacement device 120 together define a continuous granule collection system 101 for obtaining the conditioned granules from the processor 105.

Figure 4:
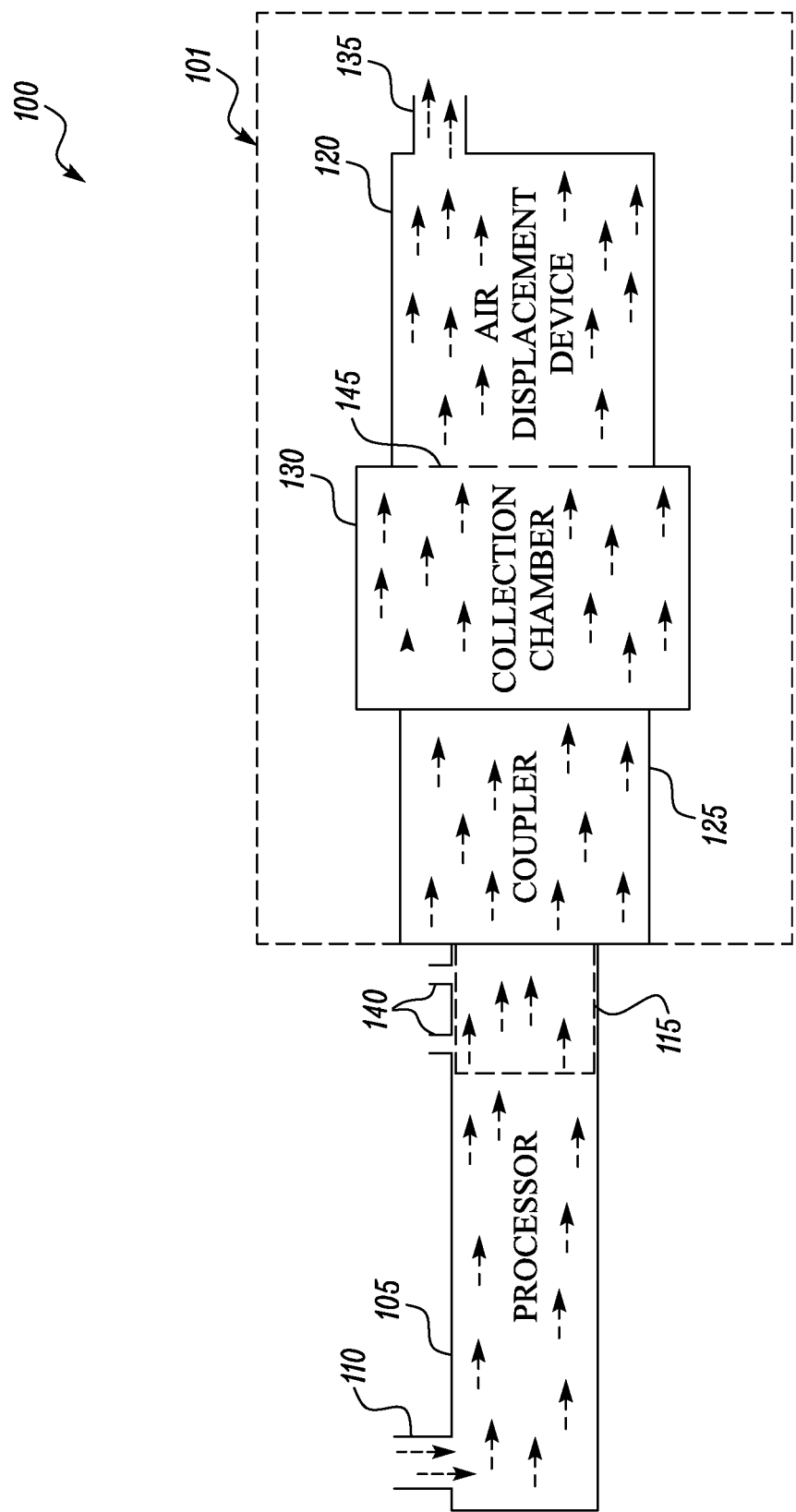
FIG. 4 is a schematic block diagram of a continuous granulation system for obtaining conditioned granules, in accordance with an embodiment of the present disclosure.

In a third embodiment, as shown in FIG. 4, the processor 105 may be provided with one or more ducts 140 to facilitate additional supply of air to the granules from the outside environment into the processor 105. In an embodiment, the outlet 115 of the processor 105 may be provided with ducts 140. The air from the outside environment may enter the processor 105 via the ducts 140 and be carried along in the direction of the unidirectional flow of air created by the air displacement device 120. As a result, the additional supply of air may also help minimize moisture content in the granules at the outlet 115 by preventing the condensation of vapor and aid in movement of the granules from the outlet 115 to the collection chamber 130. The ducts 140 may be spaced apart and/or arranged in series along a length of the outlet 115. The ducts 140 may also be provided along a circumference of the outlet 115. It may be apparent that different patterns of arrangement of the ducts 140 at the outlet 115 may be contemplated to facilitate the additional supply of air. Further, a filter 145 may also be provided between the collection chamber 130 and the air displacement device 120. The filter 145 may be configured to contain the granules in the collection chamber 130 and allow only the the air from the collection chamber 130 to be displaced to the outside environment via the exhaust 135. In the embodiment as shown in FIG. 4, the coupler 125, the collection chamber 130, the filter 145, and the air displacement device 120 together define the continuous granule collection system 101 for obtaining the conditioned granules from the processor 105.

Figure 5:
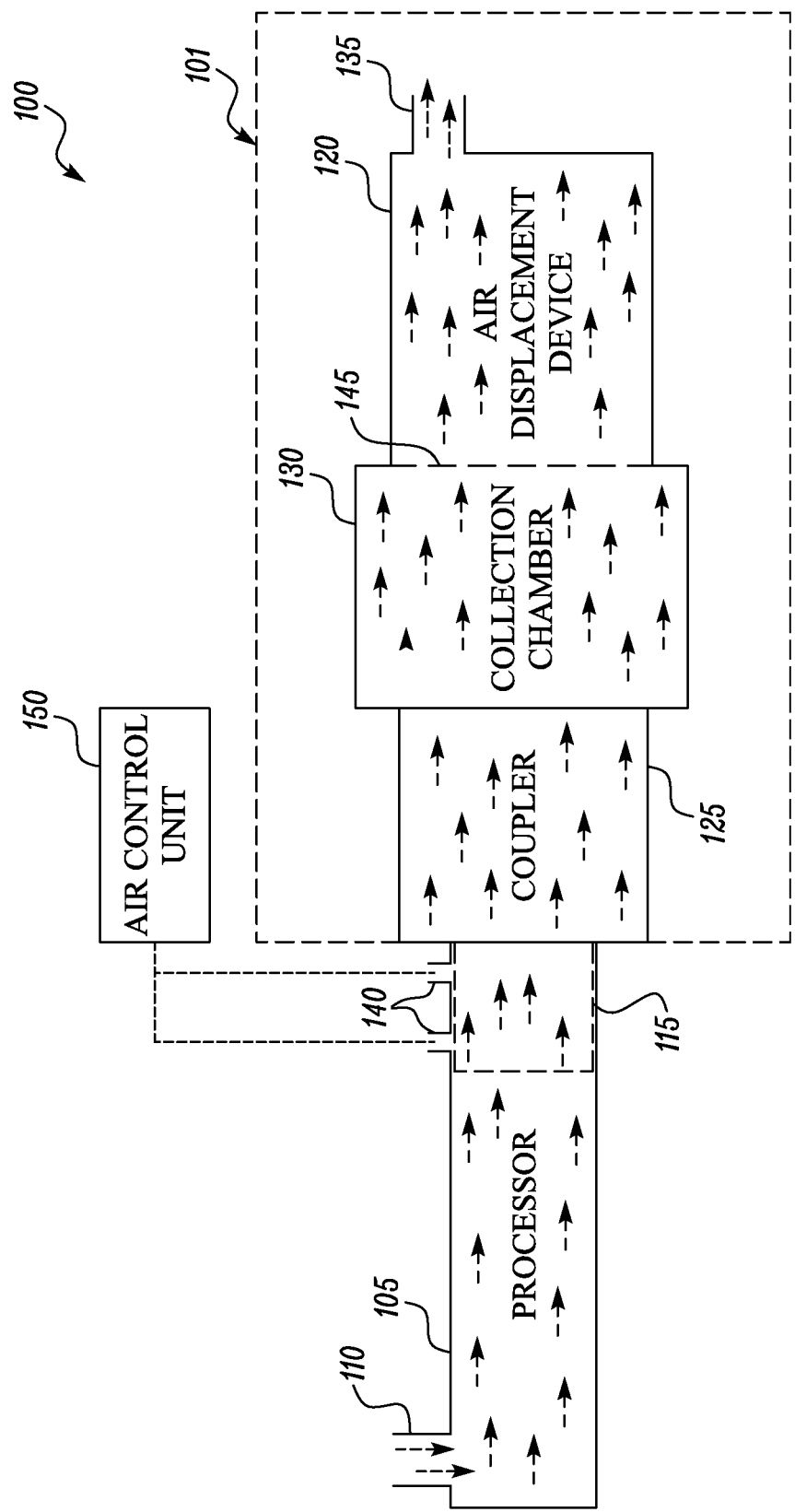
FIG. 5 is a schematic block diagram of a continuous granulation system for obtaining conditioned granules, in accordance with an embodiment of the present disclosure.

In a fourth embodiment, as shown in FIG. 5, an air control unit 150 such as for example, an air compressor, may also be connected to the ducts 140 in order to provide the additional supply of air at the outlet 115 and into the processor 105. The air control unit 150 may supply compressed air to the ducts 140. The compressed air may enter the processor 105 via the ducts 140 and be carried along in the direction of the unidirectional flow of air created by the air displacement device 120. As a result, the compressed air may also help minimize moisture content in the granules at the outlet 115 by preventing the condensation of vapor and aid in the movement of the granules from the outlet 115 to the collection chamber 130. In an embodiment, the air displacement device 120 may control the volume and the velocity of the air being displaced in conjunction with the air control unit 150.

Figure 6:
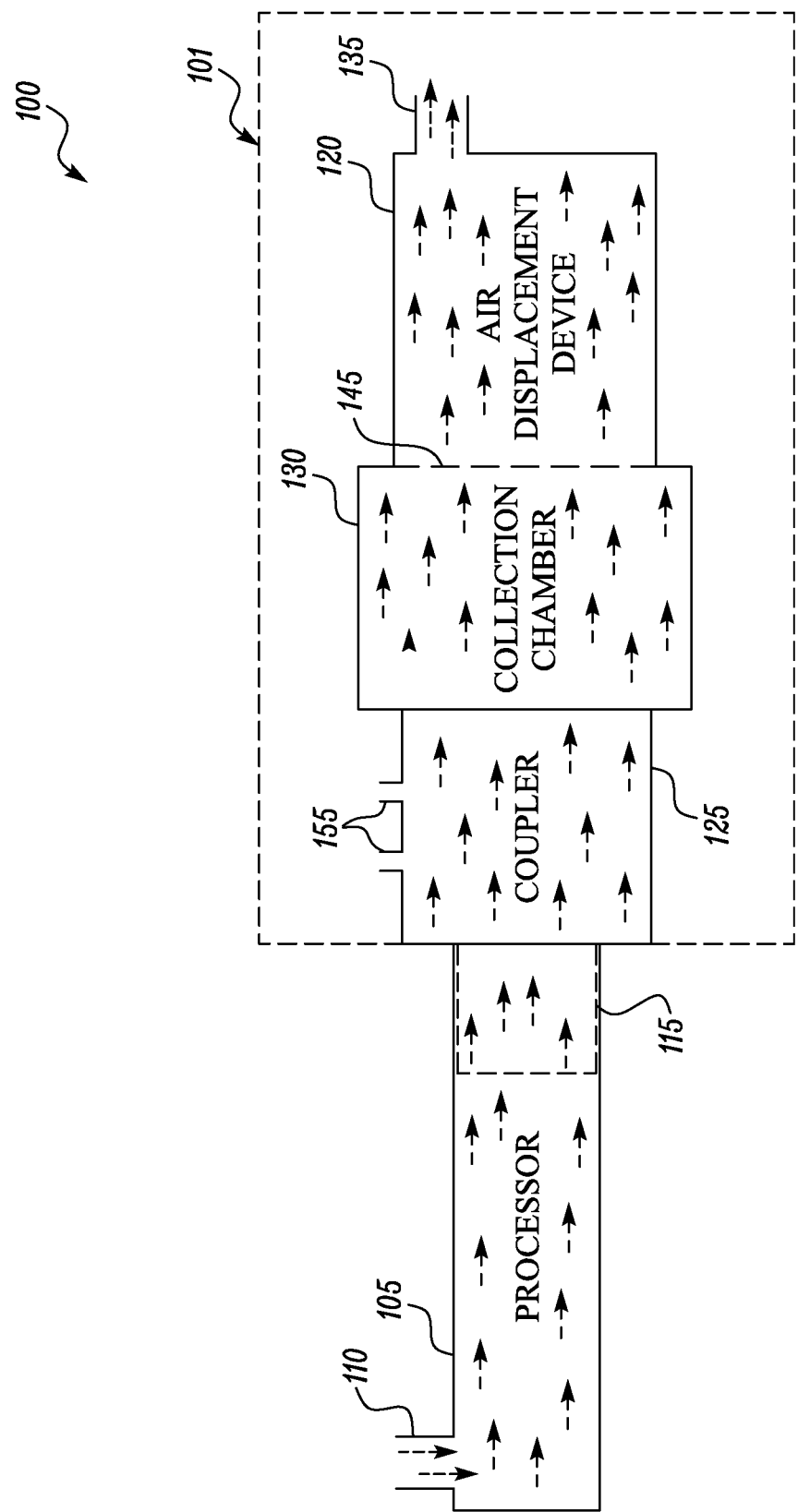
FIG. 6 a schematic block diagram of a continuous granulation system for obtaining conditioned granules, in accordance with an embodiment of the present disclosure.

In a fifth embodiment, as shown in FIG. 6, the coupler 125 may include one or more ducts 155 to facilitate the additional supply of air to the granules exiting the outlet 115 of the processor 105. The ducts 155 may be provided as an alternative to the ducts 140 (see FIG. 4) provided at the outlet 115. The ducts 155 may be spaced apart and/or arranged in series along a length of the coupler 125. The ducts 155 may also be provided along a circumference of the coupler 125 respectively. It may be apparent that different patterns of arrangement of the ducts 155 in the coupler 125 may be contemplated to facilitate the additional supply of air. In the embodiment as shown in FIG. 6, the coupler 125, the ducts 155, the collection chamber 130, the filter 145, and the air displacement device 120 together define the continuous granule collection system 101 for obtaining the conditioned granules from the processor 105.

Figure 7:
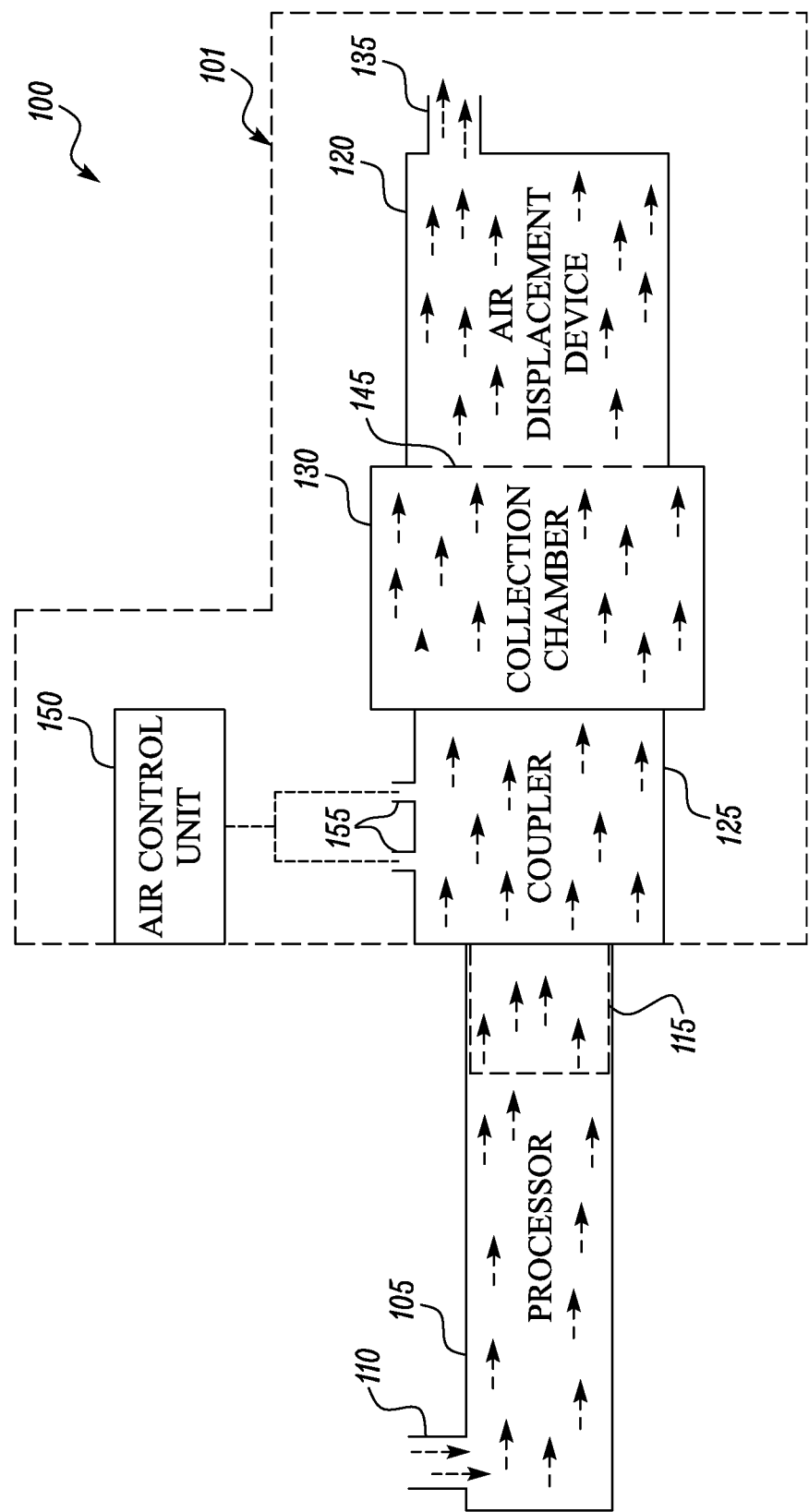
FIG. 7 is a schematic block diagram of a continuous granulation system for obtaining conditioned granules, in accordance with an embodiment of the present disclosure.

In a sixth embodiment, as shown in in FIG. 7, the air control unit 150 may supply the compressed air to the ducts 155. The compressed air may enter the coupler 125 via the ducts 155 and be carried along in the direction of the unidirectional flow of air created by the air displacement device 120. As a result, the compressed air may also help minimize moisture content in the granules exiting the outlet 115 by preventing the condensation of vapor and aid in the movement of the granules from the outlet 115 to the collection chamber 130. In the embodiment as shown in FIG. 7, the coupler 125, the ducts 155, the air control unit 150, the collection chamber 130, the filter 145, and the air displacement device 120 together define the continuous granule collection system 101 for obtaining the conditioned granules from the processor 105.

Figure 8:
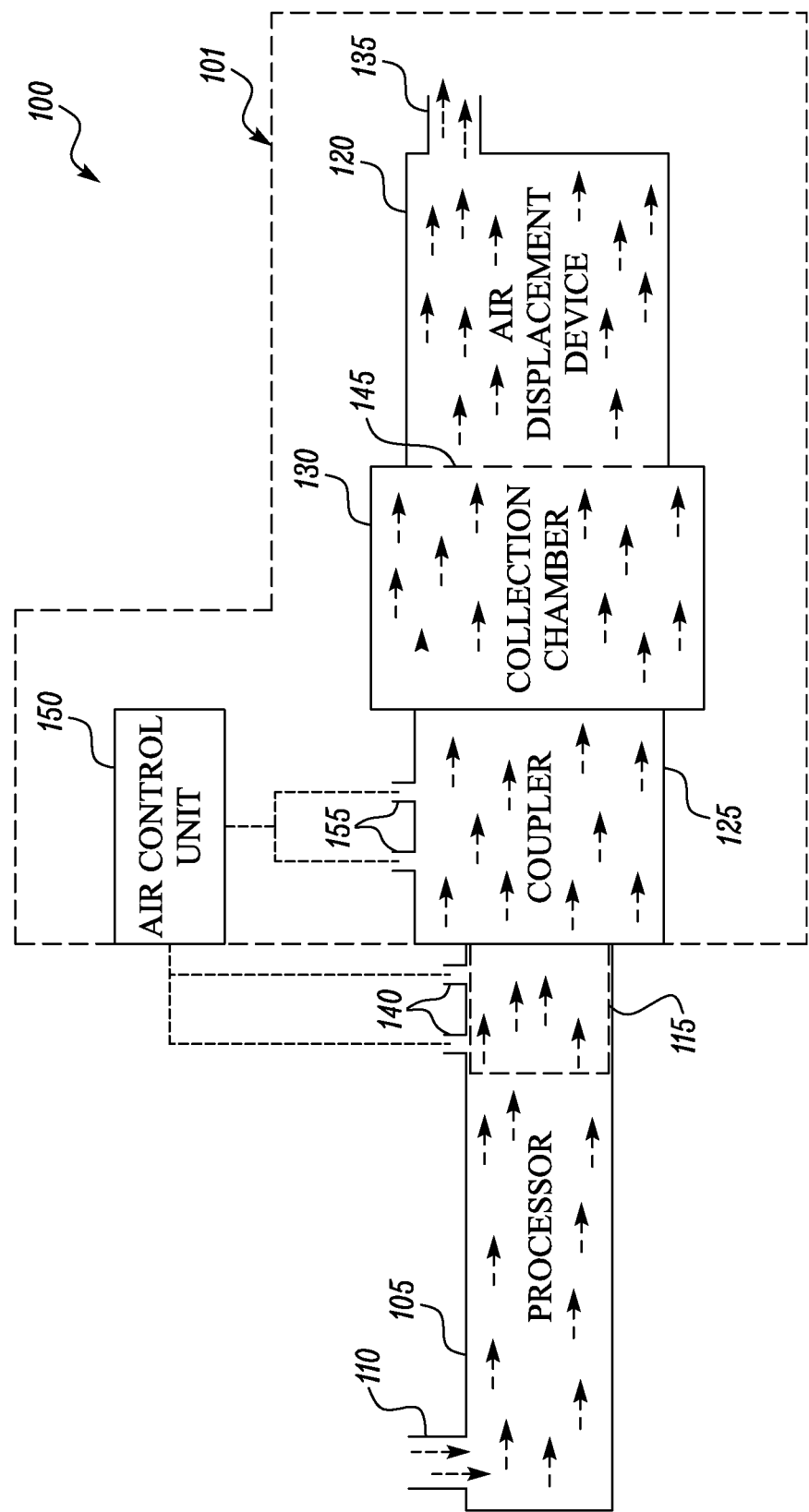
FIG. 8 is a schematic block diagram of a continuous granulation system for obtaining conditioned granules, in accordance with an embodiment of the present disclosure.

In a seventh embodiment, as shown in FIG. 8, the outlet and the coupler 125 may be provided with the ducts 140 and the ducts 155 respectively. The ducts 140 and the ducts 155 may facilitate the additional supply of air to the granules at the outlet 115 and after exiting the outlet 115 of the processor 105 respectively. In some embodiments, the ducts 140 and the ducts 155 may also be connected to the air control unit 150 (also shown in FIG. 5 and FIG. 7). The air control unit 150 may supply compressed air at the outlet 115 and to the coupler 125 via the ducts 140 and the ducts 155 respectively. The ducts 140 and the ducts 155 may be spaced apart and/or arranged in series along a length of the outlet 115 and the coupler 125 respectively. The ducts 140 and the ducts 155 may also be provided along a circumference of the outlet 115 and the coupler 125 respectively. It may be apparent that different patterns of arrangement of the ducts 140 and the ducts 155 in the outlet 115 and the coupler 125 respectively may be contemplated to facilitate the additional supply of air.

Figure 9:
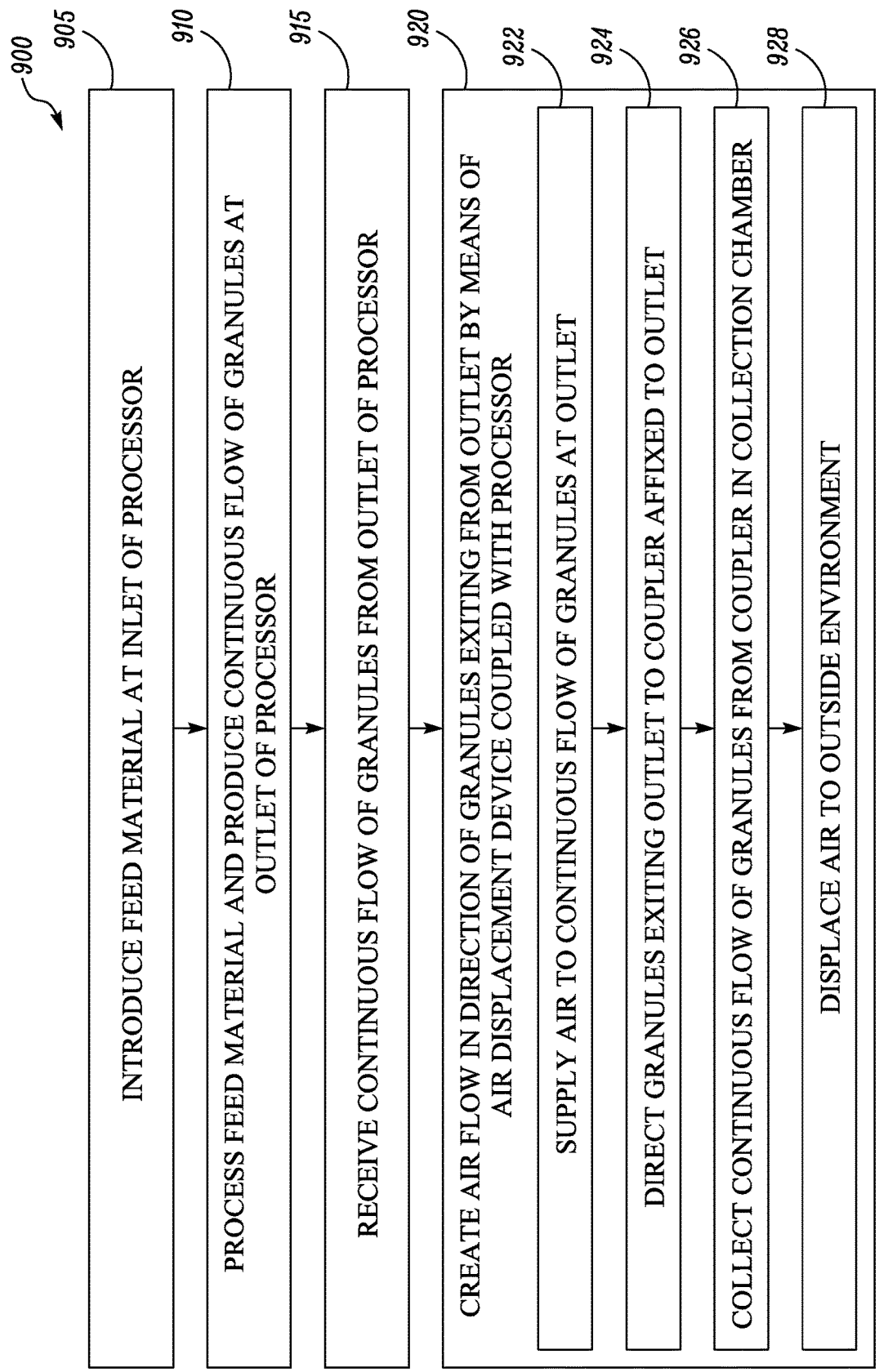
FIG. 9 is a flowchart of an exemplary continuous granulation method for obtaining conditioned granules, in accordance with an embodiment of the present disclosure.

Referring to FIG. 9, a flowchart of an exemplary continuous granulation method 900 for obtaining conditioned granules from the continuous granulation system 100 of FIG. 1 is disclosed. The conditioned granules refer to granules with properties, such as moisture content, flowability, size, porosity, and/or density, that are substantially stable over a period of time. In particular, the conditioned granules refer to granules having loss of drying values within a predefined range. By way of example, the conditioned granules may refer to granules having loss on drying values within 0.5%-3% and particularly, within 1%-2%, when separate samples of the granules are taken at 25 degrees centigrade and 50% relative humidity. However, it may be apparent that the properties of the conditioned granules may vary based on a type of the processor 105, a granulation process implemented in the processor 105, and/or the properties of the granules exiting the processor 105.

The continuous granulation method 900 includes a step 905 of introducing the feed material at the inlet 110 of the processor 105. Examples of the feed material include, powders and solids but are not limited to, amorphous, crystalline, or semi crystalline powders of active pharmaceutical ingredients (APIs), excipients, and grains such as millets and/or cereals. The excipients may include pharmaceutical grade excipients in solid, semi-solid, or liquid form and may be crystalline, amorphous, or semi crystalline in nature. The excipients may be hydrophilic, amphiphilic, or lipophilic. Excipients may be ionic or non-ionic. The excipients may be celluloses such as ethyl cellulose, hydroxypropyl cellulose, and hydroxypropyl methyl cellulose. The excipients may also be polyethylene glycol, polyethylene oxide, polyvinyl pyrrolidone, copovidone, polyvinyl acetate or polymethacrylates. The excipients may include plasticizers and/or processing aids such as triethyl citrate, triacetin, propylene glycol, dibutyl sebacate, diethyl phthalate, and glycerol monostearate. In particular, the excipients may also be fatty acids such as stearic acid, glyceryl behenate, and waxes. The excipients may also be additives such as drug-release modifiers, disintegrants and super disintegrants, thickening agents, bulking agents, binders, flow aids, sweeteners, and antioxidants. A choice of the excipients may be determined by the person skilled in the art based on properties of the API, desired properties of the pharmaceutical composition, and amenability for fragmentation. A formation of a melt or viscous mass of the feed material involves heating a mixture of an API component and an excipient component above a softening or glass transition temperature Tg or a melting point of the excipient(s).

In accordance with an embodiment, the feed material includes active ingredient(s) that may be selected from a group including foodstuffs, mineral ores, agricultural products (e.g. fertilizers), detergents, catalysts, chemicals, as well as biologically active ingredients. In accordance with an embodiment, biologically active ingredients include the APIs and ingredients for cosmetic, veterinary and for plant use.

In accordance with an embodiment, the API is selected from drugs belonging to various therapeutic categories such as antiinfectives, antibacterial agents, antihistamines and decongestants, anti-inflammatory agents, antiparasitics, antivirals, antifungals, amoebicidals, or trichomonocidal agents, analgesics, antiarthritics, antipyretics, antiasthmatic agents, anticoagulants, anticonvulsants, antidepressants, antidiabetics, antineoplastics, antipsychotics, antihypertensives, expectorants, electrolytes, laxatives, phytopharmaceuticals, muscle relaxants, and diuretics. In accordance with an embodiment, the API can be a combination of two or more drugs. The amount of the API may vary depending on various factors, for example, the intended therapeutic application, the dosage form, dosage regimen, patient population etc. In accordance with some of the embodiments, the amount of API is suitably, one which provides the therapeutic dose approved by a regulatory agency, such as the USFDA.

In accordance with an embodiment, the feed material, in addition, includes binder(s) such as potato, wheat or corn starch, hydroxypropyl cellulose, hydroxyethyl cellulose; hydroxypropyl methylcellulose, polyvinylpyrrolidone (PVP), guar gum, pectin, gelatin, sodium alginate, and other such binder(s) suitable for pharmaceutical use. In accordance with a specific embodiment, the binder is a polyvinylpyrrolidone like PVP K30, or PVP K90.

The continuous granulation method 900 also includes a step 910 of processing the feed material by the processor 105 and producing a continuous flow of granules at the outlet 115 of the processor 105. In some embodiments, the feed material may be wetted to have a moisture content in a range of 2 percent to 12 percent. In some embodiments, the moisture content in the range of 2 percent to 12 percent may also be introduced into the processor 105 via the inlet 110 or the opening 215 (as shown in FIG. 2) provided in the processor 105.

Further, the continuous granulation method 900 also include a step 915 of a receiving the continuous flow of granules from the outlet 115 of the processor 105 via the coupler 125 affixed to the processor 105. The coupler 125 may be affixed at one end to the outlet 115 of the processor 105 and to the collection chamber 130 at another end. In addition, the continuous granulation method 900 may also include a step 920 of creating a unidirectional flow of air in a direction of the granules exiting the processor 105 and away from the outlet 115 of the processor 105 by means of the air displacement device 120 coupled with the collection chamber 130. The unidirectional flow of air may condition the granules obtained in the collection chamber 130. The step 920 may include creating the unidirectional flow of air from the inlet 110 of the processor 105 to the exhaust 135 of the air displacement device 120. The air displacement device 120 may be a vacuum generating or suction device having an air flow rate in a range of 315-5250 litres per minute and a vacuum pressure in a range of 30-300 kilopascals.

In one embodiment, the step 920 of creating the unidirectional flow of air may include a step 922 of facilitating supply of air from outside the processor 105 to the continuous flow of granules at the outlet 115 via one or more ducts 140 (see FIG. 4) provided in the outlet 115 of the processor 105. The air supplied via the ducts 140 may minimize blockages and process disruptions in the processor 105. The air supplied via the ducts 140 may also minimize the moisture content in the granules at the outlet 115 by preventing the condensation of vapor generated from the granules exiting the processor 105. In some embodiments, the step 922 may also include a step of supplying compressed air to the ducts 140 by means of the air control unit 150 (see FIG. 5) connected to the ducts 140.

In another embodiment, the step 920 of creating the unidirectional flow of air may include a step 922 of facilitating supply of air from outside the processor 105 to the granules exiting the outlet 115 of the processor 105 via the ducts 155 (see FIG. 6) provided in the coupler 125. The air supplied via the ducts 155 may minimize blockages and process disruptions in the processor 105. The air supplied via the ducts 155 may also minimize the moisture content in the granules exiting the outlet 115 by preventing the condensation of vapor. In some embodiments, the step 922 may also include a step of supplying compressed air to the ducts 155 by means of the air control unit 150 (see FIG. 7) connected to the ducts 155.

In yet another embodiment, the step 920 of creating the unidirectional flow of air may include a step 922 of facilitating supply of air from outside the processor 105 to the granules at the outlet 115 and the granules exiting the outlet 115 of the processor 105 via ducts 140 at the outlet 115 and ducts 155 respectively. The air supplied via ducts 140 and the ducts 155 may minimize blockages and process disruptions in the processor 105. The air supplied via ducts 140 and the ducts 155 may also minimize the moisture content in the granules at the outlet 115 and after exiting the outlet 115 of the processor 105. In some embodiments, the step 922 may also include a step of supplying compressed air to the ducts 140 and the ducts 155 by means of the air control unit 150 (see FIG. 8) connected to the ducts 140 and the ducts 155.

Further, the step 920 of creating the unidirectional flow of air may include a step 924 of directing the granules exiting the outlet 115 to collection chamber 130 via the coupler 125 and providing a hermetically sealed channel between the processor 105 and the collection chamber 130. The step 920 of creating the unidirectional flow of air may also include a step of creating a pressure difference between a fluid pressure inside the hermetically sealed channel and the atmospheric pressure outside the processor 105.

Further, the step 920 of creating the unidirectional flow of air may include a step of creating the pressure difference between the fluid pressure inside the outlet 115 of the processor 105 and the atmospheric pressure outside the processor 105. In addition, the step 920 of creating the flow of air may also include a step 926 of collecting the granules in the collection chamber 130. In one embodiment, the step 926 may include directing the granules from the coupler 125 to the collection chamber 130.

Further, the step 920 of creating the unidirectional flow of air may also include a step 928 of displacing air from the collection chamber 130 to the outside environment via the exhaust 135 of the air displacement device 120. In an embodiment, the step 928 may also include containing the granules in the collection chamber 130 by means of the filter 145 provided between the collection chamber 130 and the air displacement device 120. Further, the step 928 may also include allowing only the air from the collection chamber 130 to be displaced to the outside environment via the filter 145 and the exhaust 135.

SPECIFIC EMBODIMENTS

A continuous granulation system for obtaining conditioned granules, comprising a processor configured to produce a continuous flow of granules at an outlet of the processor; a collection chamber positioned downstream from the processor and configured to collect the granules from the outlet; and an air displacement device coupled to the collection chamber and configured to create a unidirectional flow of air at the outlet in a direction of the granules exiting the processor and away from the outlet, the unidirectional flow of air conditioning the granules obtained in the collection chamber.

Such continuous granulation system(s), where the outlet includes a drying zone configured to continuously convey dried granules out of the processor from the outlet.

Such continuous granulation system(s), where the collection chamber is positioned upstream of the air displacement device.

Such continuous granulation system(s), where the collection chamber is positioned within the air displacement device.

Such continuous granulation system(s), comprising a coupler connected to the outlet of the processor at one end and to the collection chamber or the air displacement device at another end, wherein the coupler provides a hermetically sealed channel between the outlet and the collection chamber or the air displacement device.

Such continuous granulation system(s), where the air displacement device is configured to create a pressure difference between a fluid pressure inside the hermetically sealed channel and an atmospheric pressure outside the processor as a result of the unidirectional flow of air.

Such continuous granulation system(s), where the air displacement device is configured to create a pressure difference between a fluid pressure inside the outlet of the processor and an atmospheric pressure outside the processor as a result of the unidirectional flow of air.

Such continuous granulation system(s), where a fluid pressure inside the outlet of the processor is lower than an atmospheric pressure outside the processor.

Such continuous granulation system(s), where the air displacement device comprises an exhaust configured to continuously displace air from the collection chamber to an outside environment.

Such continuous granulation system(s), where the air displacement device is configured to generate the unidirectional flow of air from an inlet of the processor to the exhaust of the air displacement device.

Such continuous granulation system(s), comprising a filter provided between the collection chamber and the air displacement device, wherein the filter is configured to contain the granules in the collection chamber and allow only the air from the collection chamber to be displaced to the outside environment via the exhaust.

Such continuous granulation system(s), where the processor comprises one or more ducts to facilitate additional supply of air at the outlet from an outside environment into the processor, the air displacement device being configured to displace the air entering the processor via the one or more ducts in the direction of the unidirectional flow of air.

Such continuous granulation system(s), where the coupler comprises one or more ducts to facilitate additional supply of air to the granules exiting the outlet, the air displacement device being configured to displace the air entering the coupler via the one or more ducts in the direction of the unidirectional flow of air.

Such continuous granulation system(s), comprising an air control unit in communication with the one or more ducts, wherein the air control unit is configured to provide the additional supply of air.

Such continuous granulation system(s), where the conditioned granules have loss of drying values within a predefined range.

A continuous granulation method for obtaining conditioned granules, comprising introducing feed material at an inlet of a processor; processing, by the processor, the feed material to produce a continuous flow of granules at an outlet of the processor; receiving the granules from the outlet in a collection chamber; and creating a unidirectional flow of air at the outlet in a direction of the granules exiting the processor and away from the outlet by means of an air displacement device, the unidirectional flow of air conditioning the granules obtained in the collection chamber.

Such continuous granulation method(s), comprising directing the granules from the outlet of the processor to the collection chamber via a coupler; and providing a hermetically sealed channel between the processor and the collection chamber.

Such continuous granulation method(s), where the creating of the unidirectional flow of air comprises creating a pressure difference between a fluid pressure inside the hermetically sealed channel and the atmospheric pressure outside the processor.

Such continuous granulation method(s), where the creating of the unidirectional flow of air comprises creating a pressure difference between a fluid pressure inside the outlet of the processor and the atmospheric pressure outside the processor.

Such continuous granulation method(s), comprising supplying air into the processor via one or more ducts provided at the outlet.

Such continuous granulation method(s), comprising supplying the air to the coupler via one or more ducts provided in the coupler.

Such continuous granulation method(s), comprising displacing air from the collection chamber to an outside environment via an exhaust of the air displacement device.

Such continuous granulation method(s), comprising creating the unidirectional flow of air from an inlet of the processor to the exhaust of the air displacement device.

Such continuous granulation method(s), comprising containing the granules in the collection chamber by means of a filter provided between the collection chamber and the air displacement device; and allowing only the air from the collection chamber to be displaced to the outside environment via the filter and the exhaust.

A continuous granule collection system for obtaining conditioned granules from a continuous granulator comprising a collection chamber positioned downstream from the continuous granulator and configured to collect the granules from the outlet of the continuous granulator; an air displacement device coupled to the collection chamber and configured to create a unidirectional flow of air at the outlet in a direction of the granules exiting the continuous granulator and away from the outlet, the unidirectional flow of air conditioning the granules obtained in the collection chamber.

Such continuous granule collection system(s), where the collection chamber is positioned upstream of the air displacement device.

Such continuous granule collection system(s), where the collection chamber is within the air displacement device.

Such continuous granule collection system(s), comprising a coupler connected to the outlet of the processor at one end and to the collection chamber or the air displacement device at another end, wherein the coupler provides a hermetically sealed channel between the outlet and the collection chamber or the air displacement device.

Such continuous granule collection system(s), where the coupler comprises one or more ducts to facilitate additional supply of air to the granules exiting the outlet.

Such continuous granule collection system(s), comprising an air control unit in communication with the one or more ducts of the coupler, wherein the air control unit is configured to provide the additional supply of air to the coupler via the one or more ducts.

Such continuous granule collection system(s), where the air displacement device comprises an exhaust configured to continuously displace air from the collection chamber to an outside environment.

Such continuous granule collection system(s), comprising a filter provided between the collection chamber and the air displacement device, wherein the filter is configured to contain the granules in the collection chamber and allow only the air from the collection chamber to be displaced to the outside environment via the exhaust.

INDUSTRIAL APPLICABILITY

The creation of the unidirectional flow of air in the direction of the granules exiting the processor 105 and away from the outlet 115 minimizes blockages and process disruptions in the processor 105. Further, the unidirectional flow of air also assists in cooling and reduction of moisture in the granules exiting the processor 105. In addition, the unidirectional flow of air and a continuous displacement of air from the air displacement device 120 to the outside environment further facilitates stabilization or conditioning of the granules in the collection chamber 130. The disclosed continuous granulation system and method also minimizes or prevents condensation of moisture within the continuous granulation system 100 and in particular, within the processor 105.

The continuous flow of air within the continuous granulation system 100 to the outside environment facilitates removal of moisture and drying of the granules exiting the processor 105 as well as the granules present within the collection chamber 130 thereby providing stable or conditioned granules from the collection chamber 130. Further, the creation of the unidirectional flow of air advantageously minimises discharge of dust, for example, fines, and moisture into a processing area of the processor 105 and thus, prevents accumulation of the dust and the moisture in the processing area. In addition, the creation of the unidirectional flow of air also reduces volatile solvent content in the processing area, for instance, when a volatile solvent is used in the granulation process in the processor 105. Accordingly, the continuous granulation system 100, method 900 and/or the continuous granule collection system 101 of the present disclosure provide a cleaner process for the collection of the granules.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

We claim:

1. A continuous granulation system for obtaining conditioned granules, comprising:
   a twin-screw processor configured to produce a continuous flow of granules at an outlet of the twin-screw processor;
   a collection chamber positioned downstream from the twin-screw processor and configured to collect the granules from the outlet; and
   an air displacement device coupled to the collection chamber and configured to create a unidirectional flow of air at the outlet in a direction of the granules exiting the twin-screw processor and away from the outlet, wherein the unidirectional flow of air conditions the granules obtained in the collection chamber, and wherein the collection chamber is positioned within the air displacement device.

2. The continuous granulation system as claimed in claim 1, wherein the outlet includes a drying zone configured to continuously convey dried granules out of the twin-screw processor from the outlet.

3. The continuous granulation system as claimed in claim 1, comprising:
   a coupler connected to the outlet of the twin-screw processor at one end and to the collection chamber or the air displacement device at another end.

4. The continuous granulation system as claimed in claim 3, wherein the coupler provides a hermetically sealed channel between the outlet and the collection chamber or the air displacement device.

5. The continuous granulation system as claimed in claim 4, wherein the air displacement device is configured to create a pressure difference between a fluid pressure inside the hermetically sealed channel and an atmospheric pressure outside the twin-screw processor as a result of the unidirectional flow of air.

6. The continuous granulation system as claimed in claim 1, wherein the air displacement device is configured to create a pressure difference between a fluid pressure inside the outlet of the twin-screw processor and an atmospheric pressure outside the twin-screw processor as a result of the unidirectional flow of air.

7. The continuous granulation system as claimed in claim 6, wherein the fluid pressure inside the outlet of the twin-screw processor is lower than the atmospheric pressure outside the twin-screw processor.

8. The continuous granulation system as claimed in claim 1, wherein the air displacement device comprises:
an exhaust configured to continuously displace air from the collection chamber to an outside environment.

9. The continuous granulation system as claimed in claim 8, wherein the air displacement device is configured to generate the unidirectional flow of air from an inlet of the twin-screw processor to the exhaust of the air displacement device.

10. The continuous granulation system as claimed in claim 8, comprising:
a filter provided between the collection chamber and the air displacement device, wherein the filter is configured to contain the granules in the collection chamber and allow only the air from the collection chamber to be displaced to the outside environment via the exhaust.

11. The continuous granulation system as claimed in claim 1, wherein the twin-screw processor comprises one or more ducts to facilitate additional supply of air at the outlet from an outside environment into the twin-screw processor, the air displacement device being configured to displace the air entering the twin-screw processor via the one or more ducts in the direction of the unidirectional flow of air.

12. The continuous granulation system as claimed in claim 3, wherein the coupler comprises one or more ducts to facilitate additional supply of air to the granules exiting the outlet, the air displacement device being configured to displace the air entering the coupler via the one or more ducts in the direction of the unidirectional flow of air.

13. The continuous granulation system as claimed in claim 3, comprising:
an air control unit in communication with one or more ducts provided in the coupler or the twin-screw processor, wherein the air control unit is configured to provide the additional supply of air.

14. The continuous granulation system as claimed in claim 1, wherein the conditioned granules have loss of drying values within 0.5% to 3%.

15. A continuous granulation method for obtaining conditioned granules, comprising:
introducing feed material at an inlet of a twin-screw processor;
processing, by the twin-screw processor, the feed material to produce a continuous flow of granules at an outlet of the twin-screw processor;
receiving the granules from the outlet in a collection chamber; and
creating a unidirectional flow of air at the outlet in a direction of the granules exiting the twin-screw processor and away from the outlet by means of an air displacement device, wherein the unidirectional flow of air conditions the granules obtained in the collection chamber, and wherein the collection chamber is positioned within the air displacement device.

16. The continuous granulation method as claimed in claim 15, comprising:
directing the granules from the outlet of the twin-screw processor to the collection chamber via a coupler.

17. The continuous granulation method as claimed in claim 15, comprising:
providing a hermetically sealed channel between the twin-screw processor and the collection chamber.

18. The continuous granulation method as claimed in claim 17, wherein the creating of the unidirectional flow of air comprises:
creating a pressure difference between a fluid pressure inside the hermetically sealed channel and an atmospheric pressure outside the twin-screw processor.

19. The continuous granulation method as claimed in claim 15, wherein the creating of the unidirectional flow of air comprises:
creating a pressure difference between a fluid pressure inside the outlet of the twin-screw processor and an atmospheric pressure outside the twin-screw processor.

20. The continuous granulation method as claimed in claim 15, comprising:
supplying air into the twin-screw processor via one or more ducts provided at the outlet.

21. The continuous granulation method as claimed in claim 16, comprising:
supplying the air to the coupler via one or more ducts provided in the coupler.

22. The continuous granulation method as claimed in claim 15, comprising:
displacing air from the collection chamber to an outside environment via an exhaust of the air displacement device.

23. The continuous granulation method as claimed in claim 22, comprising:
creating the unidirectional flow of air from the inlet of the twin-screw processor to the exhaust of the air displacement device.

24. The continuous granulation method as claimed in claim 22, comprising:
containing the granules in the collection chamber by means of a filter provided between the collection chamber and the air displacement device; and
allowing only the air from the collection chamber to be displaced to the outside environment via the filter and the exhaust.

25. A continuous granule collection system for obtaining conditioned granules from a twin-screw processor comprising:
a collection chamber positioned downstream from the twin-screw processor and configured to collect the granules from an outlet of the twin-screw processor; and
an air displacement device coupled to the collection chamber and configured to create a unidirectional flow of air at the outlet in a direction of the granules exiting the twin-screw processor and away from the outlet, wherein the unidirectional flow of air conditions the granules obtained in the collection chamber, and wherein the collection chamber is positioned within the air displacement device.

26. The continuous granule collection system as claimed in claim 25, comprising:
a coupler connected to the outlet of the twin-screw processor at one end and to the collection chamber or the air displacement device at another end.

27. The continuous granule collection system as claimed in claim 26, wherein the coupler provides a hermetically sealed channel between the outlet and the collection chamber or the air displacement device.

28. The continuous granule collection system as claimed in claim 26, wherein the coupler comprises one or more ducts to facilitate additional supply of air to the granules exiting the outlet.

29. The continuous granule collection system as claimed in claim 28, comprising:
an air control unit in communication with the one or more ducts of the coupler, wherein the air control unit is configured to provide the additional supply of air to the coupler via the one or more ducts.

30. The continuous granule collection system as claimed in claim 25, wherein the air displacement device comprises:
an exhaust configured to continuously displace air from the collection chamber to an outside environment.

31. The continuous granule collection system as claimed in claim 30, comprising:
a filter provided between the collection chamber and the air displacement device, wherein the filter is configured to contain the granules in the collection chamber and allow only the air from the collection chamber to be displaced to the outside environment via the exhaust.

\* \* \* \* \*